(12) United States Patent
De La Fouchardiere et al.

(10) Patent No.: US 10,113,798 B2
(45) Date of Patent: Oct. 30, 2018

(54) SLIDE-TYPE EXTRACTOR

(71) Applicant: VICAT, Paris la Defense (FR)

(72) Inventors: Rene De La Fouchardiere, Nimes (FR); Frederic Gaudenzi, Le Bourget du Lac (FR); Jean Denis Paseri, Renage (FR); Guy Beauvent, Wierre Effroy (FR)

(73) Assignee: VICAT, Paris la Defense (FR)

( * ) Notice: Subject to any disclaimer, the term of this patent is extended or adjusted under 35 U.S.C. 154(b) by 702 days.

(21) Appl. No.: 14/415,727

(22) PCT Filed: Jul. 12, 2013

(86) PCT No.: PCT/FR2013/051679
§ 371 (c)(1),
(2) Date: Jan. 19, 2015

(87) PCT Pub. No.: WO2014/013169
PCT Pub. Date: Jan. 23, 2014

(65) Prior Publication Data
US 2015/0176902 A1    Jun. 25, 2015

(30) Foreign Application Priority Data
Jul. 17, 2012 (FR) ..................... 12 56892

(51) Int. Cl.
*F27D 3/00* (2006.01)
*C04B 2/12* (2006.01)
(Continued)

(52) U.S. Cl.
CPC .................. *F27D 3/00* (2013.01); *C04B 2/12* (2013.01); *C04B 7/4469* (2013.01); *F27D 3/06* (2013.01)

(58) Field of Classification Search
CPC ..................................................... F27D 3/0025
(Continued)

(56) References Cited

U.S. PATENT DOCUMENTS 4,226,564 A * 10/1980 Takahashi ................. C03B 3/00
414/166
5,151,000 A * 9/1992 Geraghty ............... F23M 11/02
110/248
(Continued)

FOREIGN PATENT DOCUMENTS

FR            2928643 A1     9/2009

OTHER PUBLICATIONS

International Search Report dated Sep. 30, 2013 re: Application No. PCT/FR2013/051679; citing: FR 2 928 643 A1.

*Primary Examiner* — Jonathan Snelting
(74) *Attorney, Agent, or Firm* — Cantor Colburn LLP

(57) ABSTRACT

The invention relates to a device (30) for the extraction and the transfer of granular mineral materials at high temperature contained in a first enclosure including a fixed upper part (32) and a mobile lower part (34) delimiting a duct (36), the mobile lower part (34) being movable in a determined direction (50) between a advanced position and a retracted position, and vice versa, to allow the flow of the granular mineral materials in the duct (36). The device further includes means (78, 80) for moving and guiding the mobile part (34) relative to the fixed part (32). The fixed part (32) and the mobile part (34) each comprise a metal outer shell (38, 58), and an inner shell (40; 60) made by stacking at least a first coating (42; 62) of thermally insulating material mounted on the metal outer shell (38; 58), and a second coating (44; 64) of refractory material mounted on the first coating (42, 62).

9 Claims, 4 Drawing Sheets

(51) Int. Cl.
*F27D 3/06* (2006.01)
*C04B 7/44* (2006.01)

(58) Field of Classification Search
USPC .................................................. 414/172, 187
See application file for complete search history.

(56) References Cited

U.S. PATENT DOCUMENTS

| | | | | |
|---|---|---|---|---|
| 5,254,151 | A * | 10/1993 | Larson | C03B 3/00 |
| | | | | 373/33 |
| 8,557,039 | B2 * | 10/2013 | Jacob | C04B 7/323 |
| | | | | 106/739 |
| 2006/0285572 | A1 * | 12/2006 | Loebner | F27B 3/16 |
| | | | | 373/76 |
| 2011/0073013 | A1 * | 3/2011 | Jacob | C04B 7/323 |
| | | | | 106/693 |

* cited by examiner

SLIDE-TYPE EXTRACTOR

TECHNICAL FIELD

The present invention relates to a slide-type extractor for the extraction and the transfer of granular mineral materials at high temperature contained in a first enclosure, as well as an installation including this device.

BACKGROUND

The slide-type extractors are conventionally used for conveying mineral materials in pieces or in granules from silos towards systems of treatment such as grinders, crushers, transporters or others in a continuous or a discontinuous manner.

In sand production lines, it is for example known to uniformly supply, with a slide-type extractor, the feed hoppers of the crushers or the grinders.

The slide-type extractors allow to adjust the flow rate accurately, have a simple structure and design making the maintenance easy and economical, a low useful power, and reduced overall dimension and investments.

If in the majority of cases, the slide-type extractors are used for granular mineral materials at ambient temperatures, it is known to use these extractors for granular mineral materials at high temperature. By "high temperature" we mean a temperature of several hundred degrees, or even greater than 1000° C.

FIG. 1 represents a device 2 for the extraction of granular mineral materials contained in a shaft furnace 4 and the transfer in a continuous furnace 6, known from the document FR2928643.

This device 2 includes a fixed upper part 8 and a mobile lower part 10 delimiting a duct 12 for the flow of granular mineral materials. This duct 12 is provided with an inlet mouth 14 connected to the shaft furnace 4 and an outlet mouth 16 connected to the continuous furnace 6. The inlet 14 and outlet 16 mouths are vertically and horizontally offset.

The mobile part 10 is movable in a direction 18 between an advanced position and a retracted position, to allow the flow of granular mineral material in the duct 12.

The device 2 includes a cylinder 20 forming reciprocating movement means of the mobile part 10 and rails 22 associated with rollers 24 mounted on the mobile part 10 forming means for guiding this mobile part 10.

A disadvantage of the device 2 is that the fixed 8 and the mobile 10 parts are likely to dilate under the effect of heat, and consequently to deform irreversibly. In these conditions, the relative movement of the mobile part 10 relative to the fixed part 8 may deteriorate over time. In addition, the abrasive nature of mineral materials quickly wears the fixed 8 and mobile 10 parts. Thus, the device 2 generates consequent maintenance costs for the operator.

Another disadvantage of the device 2 is that the hermeticity of the duct 12 is unsatisfactory. In these conditions, an ambient air flow enters this duct 12 and lowers the temperature of the granular mineral materials. The energy consumption of the continuous furnace 6 must then be increased in order to bring the granular mineral materials to a temperature in the order of 1250 to 1450° C., necessary to obtain a clinker. This energy overconsumption generates a cost for the operator and is detrimental to the environment.

BRIEF SUMMARY

The invention aims to overcome some or all of these disadvantages.

The invention concerns a device for the extraction and the transfer of granular mineral materials at high temperature contained in a first enclosure including:

a fixed upper part and a mobile lower part delimiting a duct, this duct being provided with an inlet mouth suitable for being connected to the first enclosure and with an outlet mouth, the inlet and outlet mouths being vertically and horizontally offset;

the mobile lower part being movable in a determined direction reciprocally between an advanced position and a retracted position, and vice versa, to allow the flow of the granular mineral materials in the duct; and means for moving and guiding the mobile part relative to the fixed part;

wherein the fixed part and the mobile part each comprising a metal outer shell, and an inner shell made by stacking at least:

a first coating of thermally insulating material mounted on the metal outer shell; and a second coating of refractory material mounted on the first coating.

The device according to the invention is applicable for the extraction and the transfer of granular mineral materials in solid phase, or weakly fused, and tends to weakly stick.

The first coating of thermally insulating material, protects the metal outer shell of the fixed and mobile parts against thermal constraints. Thus, the dilation of the fixed and mobile parts is limited.

The second coating of refractory material protects the first coating of thermally insulating material of the fixed and mobile parts against abrasion. Thus, the wear of the fixed and mobile parts is slowed.

Consequently, the joint presence of a first coating of thermally insulating material and of a second coating of refractory material allows to extend the lifetime of the device, and to reduce maintenance costs.

It can be added that the device according to the invention has a reduced overall dimension, which permits its use in all types of installation for the manufacture of cement.

Preferably, each coating of thermally insulating material comprises a thermal conductivity at 1000° C. comprised between 0.05 and 0.4 W/mK, a density comprised between 50 and 500 kg/m3, and/or a resistance to compression comprised between 0.1 and 0.5 MPa.

Still preferably, each coating of refractory material comprises a thermal conductivity at 1000° C. comprised between 0.2 and 2.5 W/mK, a density comprised between 1000 and 3000 Kg/m3, and/or a resistance to compression comprised between 20 and 120 MPa. For example, the refractory material may be silicon carbide.

The inlet mouth is connected to the first enclosure, under this first enclosure. The outlet mouth may be connected to a second enclosure.

The first enclosure can be a decarbonatation furnace, a clinkerization furnace or a pre-heater. The first enclosure can be a shaft furnace, a continuous furnace, a rotary furnace, or other.

The second enclosure can be a decarbonatation furnace, a clinkerization furnace, a cooler. The second enclosure can be a shaft furnace, a continuous furnace, a rotary furnace, a grate cooler with reciprocating movement (reciprocating grate cooler) or other.

The outlet mouth may not be connected to a second enclosure. In this case, the outlet mouth opens outwards.

The device according to the invention may include one or more of the following features.

Advantageously, the mobile part comprises a bottom wall, or base, having an upstream end in line with the inlet mouth and a downstream end turned toward the outlet mouth; and the base is inclined from top to bottom, from its upstream end to its downstream end.

In these conditions, the granular mineral materials fall by gravity inside the duct on the base. The flow of granular mineral materials in the duct is made by reciprocating movement of the mobile part and is facilitated by the inclination of the base.

Following one feature, the upstream end of the base comprises a step transverse to the movement direction of the mobile part.

In these conditions, when the mobile part is reciprocally moved from its advanced position toward its retracted position, granular mineral materials fall onto the base downstream of the step.

When the mobile part is moved from its retracted position to its advanced position, the step pushes the granular mineral materials towards the outlet mouth, facilitating even more the flow of granular mineral materials in the duct.

Advantageously, the device comprises sealing means arranged between and/or around the fixed and mobile parts, so that this duct is hermetically sealed.

Thus the amount of ambient air admitted in the duct, and likely to lower the temperature of the granular mineral materials, is reduced. As a result, the thermal balance of an installation equipped with a device according to the invention is improved.

Following one feature, the mobile part comprises first and second side walls parallel to its movement direction, these first and second side walls each having an upstream end and a downstream end; and the sealing means comprise a bellows connected on the one hand to the fixed part and on the other hand to the downstream ends of the base and the first and second side walls of the mobile part.

Such bellows ensures the sealing between the fixed and the downstream ends of the base and the first and second side walls of the mobile part.

Following another feature, the fixed part comprises first and second side walls parallel to the movement direction of the mobile part;

the first and second side walls of the mobile part have, close to their upper edges, at least one groove or a rib formed in the coating of refractory material, parallel to the movement direction of the mobile part; and the first and second side walls of the fixed part have, close to their lower edges, at least one rib or groove formed in the coating of refractory material, parallel to the movement direction of the mobile part, and arranged to cooperate without contact with, respectively, the groove or rib formed in the coating of refractory material of the mobile part.

The association of a rib and of a groove forms a baffle opposing the rectilinear propagation of the thermal radiation, and consequently, the heat loss of granular mineral materials by thermal radiation.

In addition, such a baffle creates a pressure loss which limits the hot air circulation from the inside of the duct towards the outside of this duct.

Following another feature, the mobile part comprises a third side wall transverse to its movement direction, connecting the first and second side walls; and the fixed part comprises a third side wall transverse to the movement direction of the mobile part, connecting the first and second side walls.

Advantageously, the sealing means comprise:
a channel extending from the first, second and third side walls of the fixed part, shaped as "U" in top view, surrounding the first, second and third side walls of the mobile part, and containing a fluid, such as water or oil, or a granular composition, such as sand;
a return extending from the first, second and third side walls of the mobile part, immersed in the fluid or the granular composition; and
the return is arranged to move within the channel without contact with the latter, during the movement of the mobile part.

The association of the channel and of the return forms a seal between the first, second and third side walls of the fixed part and the first, second and third side walls of the mobile part.

The invention also concerns an installation including:
a first enclosure adapted to heat the granular mineral materials at high temperature; and
an extraction device as presented previously.

Following to one feature, the installation includes a second enclosure to receive the granular mineral materials extracted from the first enclosure, and the outlet mouth of the duct is connected to this second enclosure.

BRIEF DESCRIPTION OF THE DRAWINGS

The invention will be better understood using the following description with reference to the annexed schematic drawing representing, for example, a device for the extraction and the transfer of granular mineral materials at high temperature contained in a first enclosure according to the invention.

DETAILED DESCRIPTION

Figure 1:
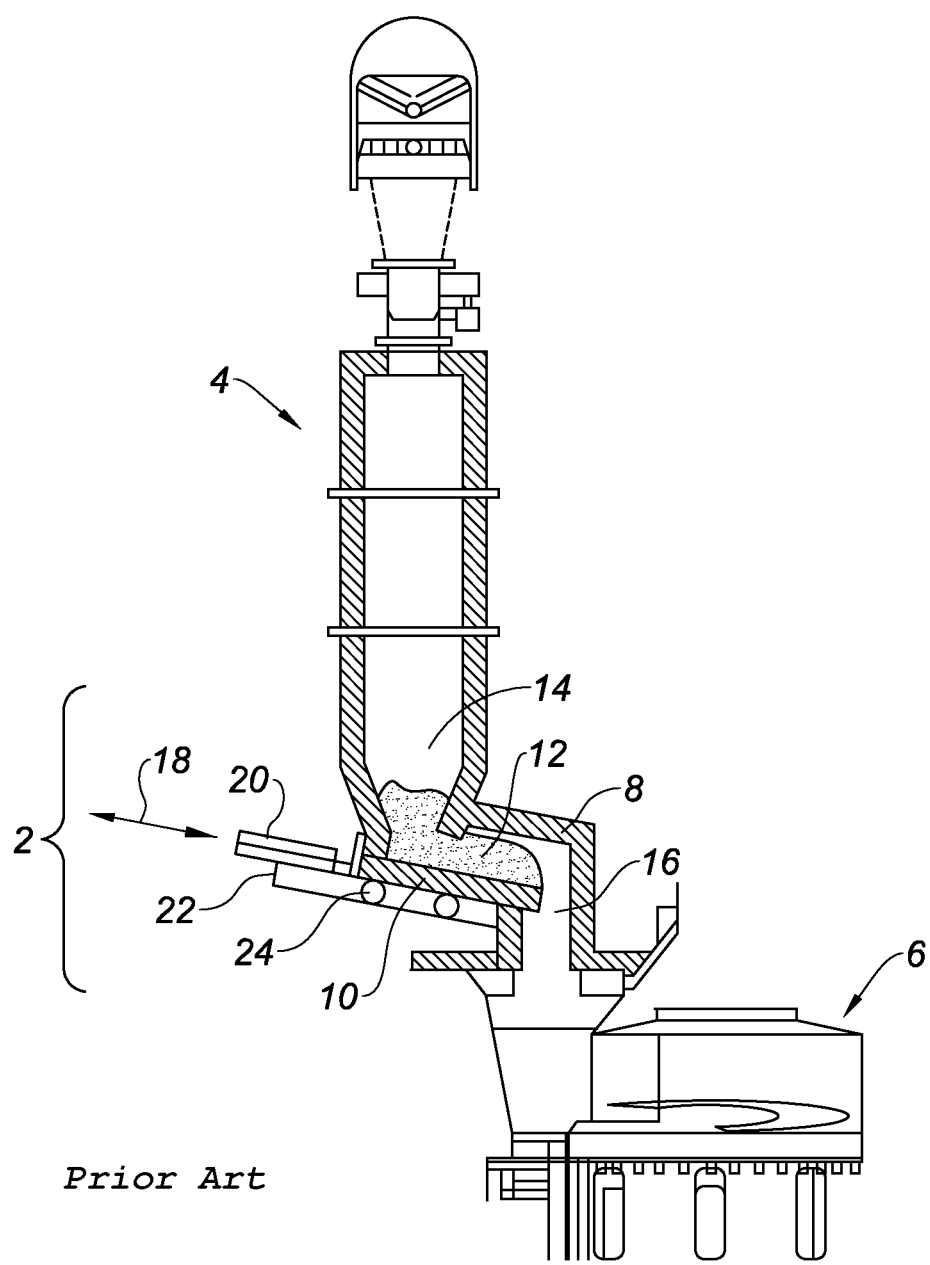
FIG. 1 is a sectional view of a device known from the document FR2928643.
Figure 2:
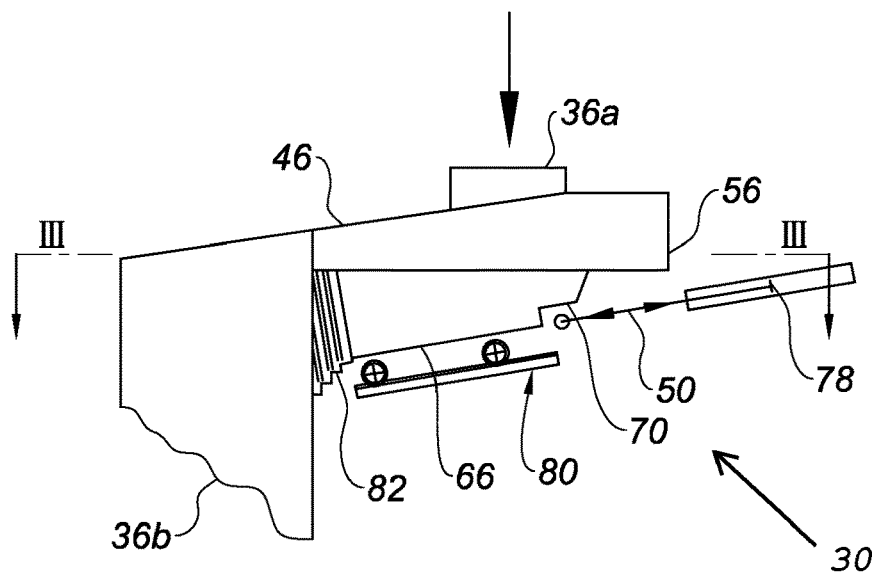
FIG. 2 is a side view of a slide-type extractor according to the invention.

FIGS. 2 to 5 represent a device 30 for the extraction of granular mineral materials at high temperature contained in a decarbonatation furnace and the transfer of these granular mineral materials in a clinkerization furnace. In the example, the temperature of the mineral materials contained in the decarbonatation furnace is in the order of 1000° C.

The device 30 includes a fixed upper part 32 and a mobile lower part 34 delimiting a duct 36 (represented in FIGS. 4 and 5) for the flow of the granular mineral materials.

The duct 36 is provided with an inlet mouth 36a connected to the decarbonatation furnace and with an outlet mouth 36b connected to the clinkerization furnace. The inlet 36a and outlet 36b mouths are vertically and horizontally offset.

The fixed part 32 comprises a metal outer shell 38, and an inner shell 40 made by stacking of:

a coating 42 of thermally insulating material mounted on the outer shell 38; and a coating 44 of refractory material mounted on the coating 42.

The fixed part 32 comprises a top wall 46, side walls 48 parallel to a direction 50, and a side wall 52 transverse to the direction 50 connecting the side walls 48.

Figure 6:
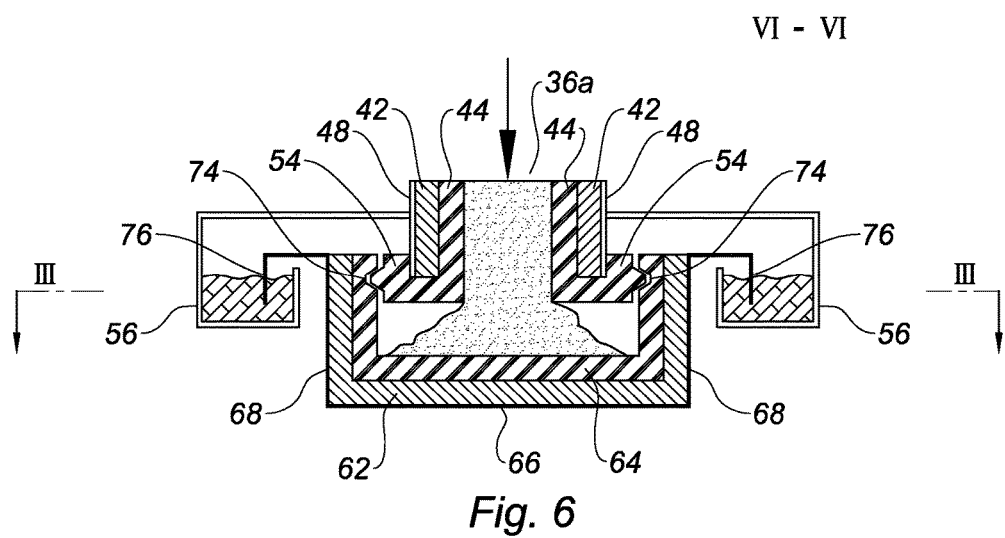
FIG. 6 is a sectional view according to the line VI-VI of FIG. 3.

The side walls 48 have, close to their lower edges of the ribs 54 (represented in FIG. 6) formed in the coatings 44. The ribs 54 are parallel to the direction 50. The function of the ribs 54 will appear thereafter.

Figure 3:
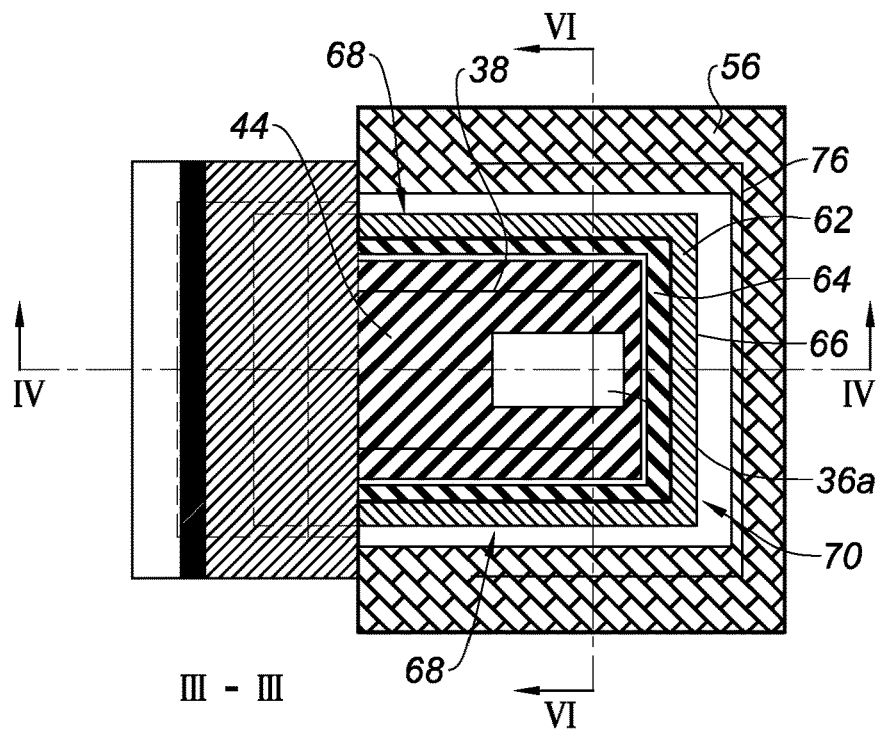
FIG. 3 is a sectional view according to the line III-III of FIG. 2.

The fixed part 32 comprises in addition a channel 56 extending from the side walls 48 and 52, and turned downward. The channel 56 is shaped as "U" in top view (such as represented in FIG. 3). The channel 56 contains a fluid, such as water or oil, or a granular composition, such as sand. The function of the channel 56 will appear thereafter.

The mobile part 34 is reciprocally movable in the direction 50 between an advanced position (represented in FIG. 4) and a retracted position (represented in FIG. 5), to allow the transfer of granular mineral materials in the duct 36 by reciprocating movement.

The mobile part 34 comprises a metal outer shell 58, and an inner shell 60 made by stacking of:

a coating 62 of thermally insulating material mounted on the metal outer shell 58; and a coating 64 of refractory material mounted on the coating 62.

The mobile part 34 comprises a bottom wall or base 66, side walls 68 (represented in FIG. 6) parallel to the direction 50, and a side wall 70 transverse to the direction 50 connecting the side walls 68.

The base 66 has an upstream end 66a and a downstream end 66b. The base 66 is inclined from top to bottom, from its upstream end 66a toward its downstream end 66b.

In this description, the terms "upstream" and "downstream" are used with reference to the sense of flow of the granular mineral materials in the duct 36.

The upstream end 66a extends in line with the inlet mouth 36a of the duct 36. The upstream end 36a comprises a step 72 transverse to the direction 50. The downstream end 66b is turned toward the outlet mouth 36b of the duct 36.

The side walls 68 each have an upstream end and a downstream end. The side walls 68 have, close to their upper edges of the grooves 74 (represented in FIG. 6) formed in the coatings 64 of refractory material. The grooves 74 are parallel to the direction 50. These grooves 74 are arranged to cooperate without contact with, respectively, the ribs 54 formed in the coating 44 of refractory material of the fixed part 32.

The mobile part 34 also comprises a return 76 extending from the side walls 68 and 70, turned downward, and shaped in "U" in top view (as represented in FIG. 3).

The channel 56 and the return 76 are arranged so that the channel 56 surrounds the side walls 68 and 70 of the mobile part 40 (as represented in FIG. 3), and that the lower edge of the return 76 is immersed in the fluid or the granular composition, and can move within the channel 56 without contact with the latter, during the reciprocating movement of the mobile part 34 in advanced position and in retracted position.

The fluid or the sand level is such that, during the reciprocating movement of the mobile part 34, the lower edge of the return 76 is permanently immersed in the fluid or the sand.

The baffles formed by the ribs 54 and grooves 74 allow limiting the depression acting on the channel 56 and the return 76.

The device 30 includes reciprocating movement means 78 of the mobile part 34. These reciprocating movement means 78 comprise for example a pneumatic cylinder, a hydraulic cylinder or a linkage mechanism associated with a motor.

The device 30 includes means 80 for guiding the mobile part 34 relative to the fixed part 32. These guide means 80 comprise for example a plurality of castor wheels fixed under the base 66 of the mobile part and engaged in rails parallel to the base 66.

The device 30 includes a textile bellows 82 resistant to high temperatures. For example, the bellows is made of ceramic fibers, such as the fibers known under the Hytex 2500 or Nextel references, for example. The bellows 82 is connected on the one hand to the fixed part 32 and on the other to the downstream ends of the bottom wall 66 and of the side walls 68 of the mobile part 34. The bellows 82 is likely to extend, and alternately to contract, in response to the reciprocating movement of the mobile part 34 in retracted position and in advanced position. Thus, the bellows 82 has a general "U" shape in a vertical plane.

The ribs 54 and grooves 74, the channel 56 and the return 76, and the bellows 82, form sealing means arranged between the fixed 32 and the mobile 34 parts of the duct 36 to render this duct 36 hermetical to the ambient air.

In use conditions, the cylinder 78 animates the mobile part 34 of a reciprocating movement between its advanced position and its retracted position.

Figure 5:
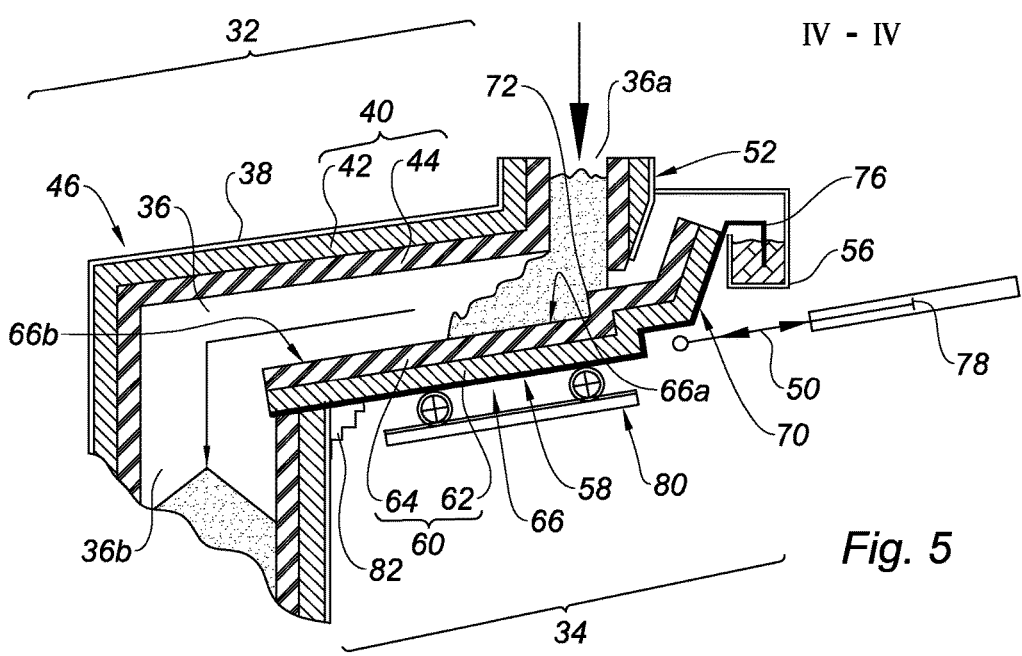

When the mobile part 34 is moved from its advanced position toward its retracted position (such as represented in FIG. 5), the granular mineral materials coming from the decarbonatation furnace, brought through the inlet mouth 36a, fall by gravity on the bottom wall 66 of the mobile part 34, downstream of the step 72.

Figure 4:
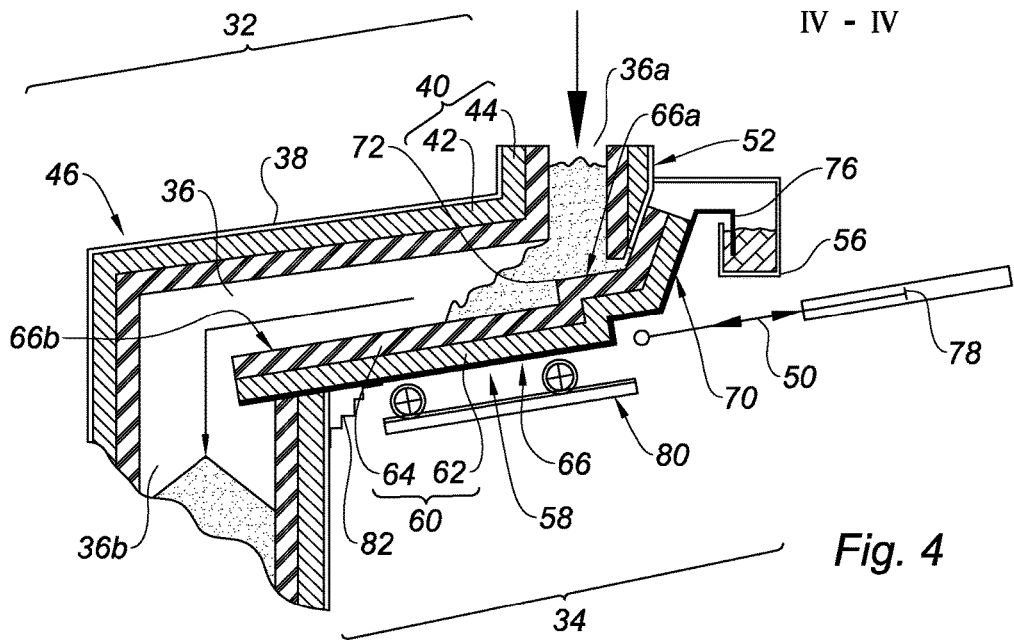
FIGS. 4 and 5 are two sectional views of the device of FIG. 2 according to the line IV-IV of FIG. 3, in which the mobile part is respectively in advanced position and in retracted position.

When the mobile part 34 is moved from its retracted position to its advanced position (such as represented in FIG. 4), the step 72 pushes the granular mineral materials in direction of the outlet mouth 36b.

It is possible to adjust the extraction flow rate of the granular mineral materials by varying the frequency and the stroke of the mobile part 34.

An increase in frequency increases the extraction flow rate. A decrease in frequency reduces the extraction flow rate.

A lengthening of the stroke increases the extraction flow rate. A shortening of the stroke decreases the extraction flow rate.

A slide-type extractor according to the invention can, for example be installed beneath a briquetted shaft furnace, 75 cm in internal diameter and 3 cm high. The extractor may have an overall width of 1.25 m and an overall length of 1.60 m. The base of the extractor may have a length of 1.40 m and a width of 0.85 m. The extractor stroke may be of 40 mm and each double stroke allows to extract about 5 kg of material at high temperature, for example in the order of 1200° C.

This extractor can be used for the extraction of granular mineral materials at high temperatures, in the order of 1250 to 1450° C., contained in a clinkerization furnace and the transfer of these granular mineral materials in a cooler.

It goes without saying that the invention is not limited to the sole embodiment of the device described above as an example, on the contrary it encompasses all the alternative embodiments.

It is for example possible to add seals, and additional baffles allowing to prevent the heat losses and the ambient air inlets when the device is in depression relative to the atmosphere.

The base is not necessarily inclined, but could be horizontal.

The invention claimed is:

1. A slide-type extractor for extraction and transfer of granular mineral materials at high temperature contained in a first enclosure including:
    a fixed upper part and a mobile lower part delimiting a duct, this duct being provided with an inlet mouth suitable for being connected to the first enclosure and with an outlet mouth, the inlet and outlet mouths being horizontally and vertically offset;
    the mobile lower part being movable in a determined movement direction reciprocally between a advanced position and a retracted position to allow a flow of the granular mineral materials in the duct; and
    means for moving and guiding the mobile lower part relative to the fixed upper part;
    wherein the fixed upper part and the mobile lower part each comprise a metal outer shell, and an inner shell made by stacking at least:
    a first coating of thermally insulating material mounted on the metal outer shell; and
    a second coating of refractory material mounted on the first coating,
    wherein the slide-type extractor further comprises sealing means arranged between and/or around the fixed upper part and the mobile lower part, such that the duct is hermetically sealed.

2. The slide-type extractor according to claim 1, wherein the mobile lower part comprises a bottom wall having an upstream end vertically in line with the inlet mouth and a downstream end turned toward the outlet mouth;
    and the bottom wall is inclined from top to bottom, from its upstream end toward its downstream end.

3. The slide-type extractor according to claim 2, wherein the upstream end of the bottom wall comprises a step transverse to the movement direction of the mobile lower part.

4. The slide-type extractor according to claim 1, wherein the mobile lower part comprises first and second side walls parallel to the movement direction, these first and second side walls each having an upstream end and a downstream end; and
the sealing means comprise a bellows connected to the fixed upper part and to the downstream ends of the bottom wall and of the first and second side walls of the mobile lower part.

5. The slide-type extractor according to claim 4, wherein the fixed upper part comprises first and second side walls parallel to the movement direction of the mobile lower part;
    the first and second side walls of the mobile lower part have, close to their upper edges, at least one groove or rib formed in the second coating of refractory material of the mobile lower part, parallel to the movement direction of the mobile lower part; and
    the first and second walls of the fixed upper part have, close to their lower edges, at least one rib or groove formed in the second coating of refractory material of the fixed upper part, parallel to the movement direction of the mobile lower part, and arranged to cooperate without contact with, respectively, the groove or rib formed in the second coating of refractory material of the mobile lower part.

6. The slide-type extractor according to claim 5, wherein the mobile lower part comprises a third side wall transverse to the movement direction, connecting the first and second side walls of the mobile lower part; and
    the fixed upper part comprises a third side wall transverse to the movement direction of the mobile lower part, connecting the first and second side walls of the fixed upper part.

7. The slide-type extractor according to claim 6, wherein the sealing means comprise:
    a channel extending from the first, second and third side walls of the fixed upper part, shaped as a "U" in top view, surrounding the first, second and third side walls of the mobile lower part, and containing a fluid or a granular composition;
    a return extending from the first, second and third side walls of the mobile lower part, immersed in the fluid or the granular composition; and
    the return is arranged to move within the channel without contact with the channel, during the movement of the mobile lower part.

8. An installation including:
    a first enclosure adapted to heat granular mineral materials at high temperature; and
    a slide-type extractor according to claim 1.

9. The installation according to claim 8, further including a second enclosure for receiving the granular mineral materials extracted from the first enclosure, and the outlet mouth of the duct is connected to this second enclosure.

* * * * *